C. DE LUKACSEVICS.
ROTARY MOTOR.
APPLICATION FILED AUG. 21, 1907.

974,803.

Patented Nov. 8, 1910.
8 SHEETS—SHEET 2.

FIG. 2.

WITNESSES
Thos. H. Brown
Chas. J. Clagett

INVENTOR
Charles de Lukacsevics
BY
George H. Stockton
his ATTORNEY

C. DE LUKACSEVICS.
ROTARY MOTOR.
APPLICATION FILED AUG. 21, 1907.

974,803.

Patented Nov. 8, 1910.
8 SHEETS—SHEET 5.

Fig. 5

WITNESSES
Thos. F. Brown
Chas. F. Clagett

INVENTOR
Charles de Lukacsevics
BY
George H. Stocke Jr.
his ATTORNEY

C. DE LUKACSEVICS.
ROTARY MOTOR.
APPLICATION FILED AUG. 21, 1907.

974,803.

Patented Nov. 8, 1910.
8 SHEETS—SHEET 6.

UNITED STATES PATENT OFFICE.

CHARLES DE LUKACSEVICS, OF NEW YORK, N. Y., ASSIGNOR TO GEORGE W. MORGAN, OF NEW YORK, N. Y.

ROTARY MOTOR.

974,803. Specification of Letters Patent. Patented Nov. 8, 1910.

Application filed August 21, 1907. Serial No. 389,441.

*To all whom it may concern:*

Be it known that I, CHARLES DE LUKACSEVICS, a citizen of the United States, and resident of New York, county of New York, State of New York, have invented certain new and useful Improvements in Rotary Motors, of which the following is a specification.

My invention relates to improvements in rotary motors adapted to be operated by successive explosions of gas under pressure.

The details of the invention will be fully set forth in the present specification and illustrated in the accompanying drawings.

A characteristic feature of the invention resides in the fact that a succession of cylinders arranged side by side and coupled together to form practically a single cylinder is provided with a succession of pistons engaging with each other, the end pistons being provided with extensions for connection with belts or gearing for transmitting the power applied to the composite piston by means of successive explosions in the several cylinders.

Each section of the piston is cut away so as to form three chambers and leave three chamber ends constituting the parts of the piston upon which the explosive power of the gas is expended. I prefer to couple together a series, say, of four to six sections, the whole constituting a common piston for from four to six cylinders, as the case may be. These sections are of uniform design and arrangement, except that the solid portions between the chamber ends are so arranged upon the surface of the piston sections or the sections themselves are capable of such radial adjustment that, in the case of four piston sections in series, the solid portions of the several sections would be arranged thirty degrees apart, or in the case of six sections, twenty degrees apart.

My invention will be understood by referring to the accompanying drawings in which—

Referring to the first figure of the drawing, 1 is a cylinder section and 2 a piston section, the latter being arranged within the former and adapted to be rotated therein. The several cylinder sections are rigidly connected with each other by means of long bolts, 3, 3, 3, as clearly shown by comparison of Figs. 1, 3 and 5. The several piston sections are each formed with a central opening, 4, and a boss or flange, 5, at one end, and a recess or depression, 6, at the other end for receiving the boss or flange of the succeeding section. Moreover, these several sections are held from relative radial movement by means of bolts or pins, 7, 7, which in this instance are shown as six in number to provide for that number of radial adjustments of the piston sections. At each end of the frame of the motor is an end plate, one of which is shown at 8 in Fig. 3. It will be understood that a similar plate exists at the opposite end of the frame and that the piston section at said opposite end is provided with a boss or flange long enough and so formed as to receive a belt or gearing for transmitting the motion of the piston to a device which is to be operated by my rotary motor.

Figure 3:
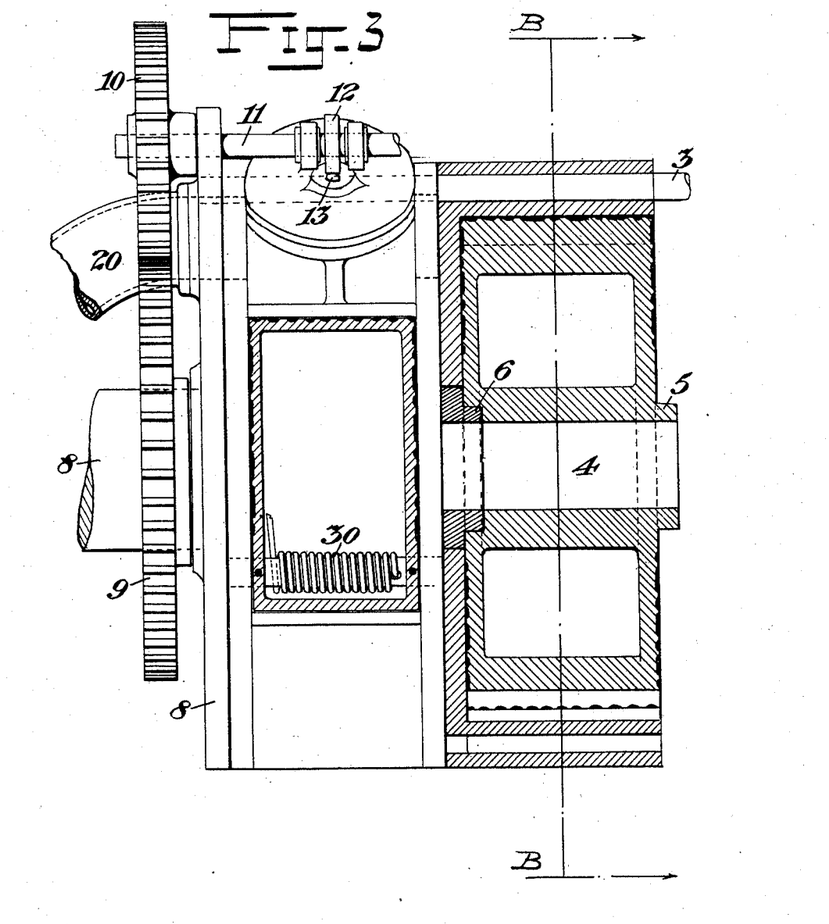
Fig. 3 is partly an elevation and partly a vertical section through the line C—C of Fig. 1 at the left and through the line A—A at the right.

Referring to Fig. 3 it will be seen that the piston section at the left has secured to it a gear-wheel, 9, engaging with a pinion, 10, secured to a cam-carrying shaft, 11. The gear-wheel 9 and the pinion 10 are so arranged that a single rotation of the gear-wheel will cause three rotations of the pinion and consequently three rotations of the cam shaft 11. Accordingly, the cam, 12, on the said cam shaft will, during one revolution of the piston, be brought three times into engagement with a rod, 13, mounted in a chamber, 14, and carrying at its inner end a valve, 15, adapted to be pressed by a spring, 16, against a seat, 17. The inner portion of the rod is suitably supported inside the chamber 14 by a frame or bracket, 18, against which the spring 16 presses at one end, while at the opposite end it presses against a collar, 19, secured to the rod 13.

Figure 1:
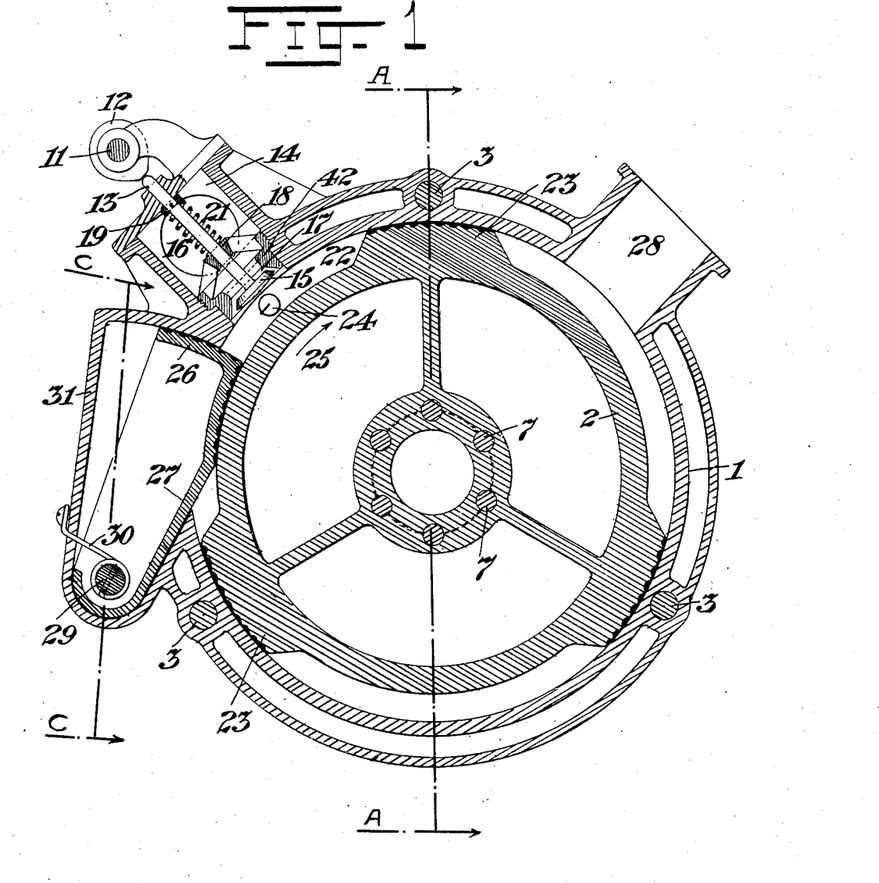
Figure 1 is a cross section through the cylinder and piston of one form of my rotary motor.

The chamber 14 is connected by a pipe, 20, with any well known form of compressor (not shown) the said pipe being adapted to carry gas under pressure into the chamber and through the said chamber into succeeding chambers mounted above the several cylinder sections beyond the section shown, for example, in Figs. 1 and 3. In this way there is always gas under pressure in active relation to the several cylinder sections and the action of the gas is dependent upon the condition of the several valves 15 in the several chambers above the cylinder sections. The gas passes, for example, from the chamber 14 through the opening, 21, to the next chamber and so on to the last or final chamber which is sealed off at its remote end.

Figure 2:
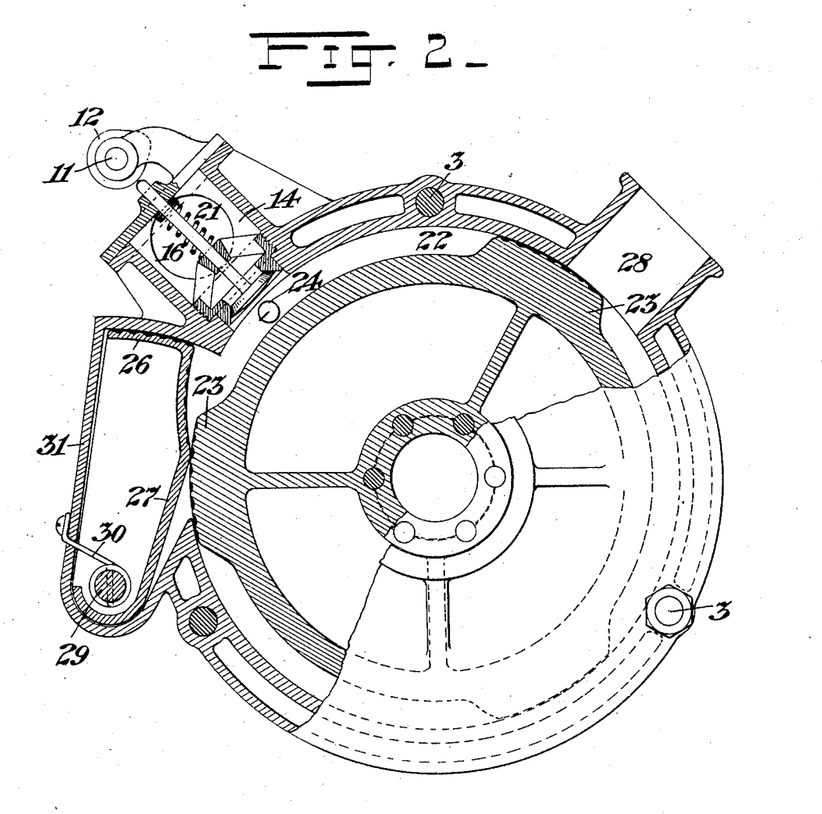
Fig. 2 is partly an elevation and partly a section of the same type of motor showing the parts moved forward through the distance of approximately thirty degrees.

Referring more particularly to Fig. 1, in the position of the parts there shown, the gas under pressure is passing by way of the valve 15 into a chamber, 22, formed upon two, solid portions, 23, 23, on the piston 2. At 24 is shown an igniting plug properly disposed with relation to the chamber 22. It is not thought necessary to describe the details of this igniting apparatus, as any suitable apparatus of the kind may be used and the present invention does not relate to that part of the apparatus. Assuming, now, that the rotation of the piston is in the direction of the arrow, 25, and that the cam shaft 11 is being operated by the rotation of the piston, there will come a time when the parts will occupy a position wherein the wall of the upper solid portion 23 of the piston will form one end of the chamber 22, while a portion of the upper wall, 26, of a locking device, 27, will form the opposite end of the chamber, just as it is shown in Fig. 1, except that the parts will have moved a little forward in the direction of the arrow 25 and the valve 15 will have been carried to its seat. At this moment the igniting plug does its work, the explosion takes place and the piston is carried still farther in the direction of the arrow until the exhaust is effected through the exhaust pipe, 28. By this time another of the solid portions 23 of the piston will have been carried into engagement with the free end of the locking device which being secured to the pivot 29 and held to its work by a spring, 30, will yield under the pressure exerted by the solid portion 23 and will be carried within its containing box, 31, into the position shown in Fig. 2. Meanwhile, in the more remote sections of the cylinder one or more explosions will have taken place under conditions similar to those already described, and the piston will continue its rotation until the second-named of the solid portions 23 shall have reached the position occupied by the first-named solid portion in Fig. 1 and thereafter the action already described in connection with Fig. 1 will be repeated.

It will be seen that one end of the spring 30 is secured to the wall of the containing chamber 31, while the opposite end thereof is run through the pivot 29 causing the locking device 27 to be pressed against the surface of the piston at all times.

The locking device 27 is obviously so arranged in relation to the piston 2 that when the explosion takes place the force thereof, so far as the locking device is concerned, is directed toward the pivot 29, thus giving to the structure the greatest possible resisting power. The spring 30 meanwhile holds the locking device to its work and there is no escape of gas in the direction of the locking device, whereby great effectiveness of operation is secured.

Figure 8:
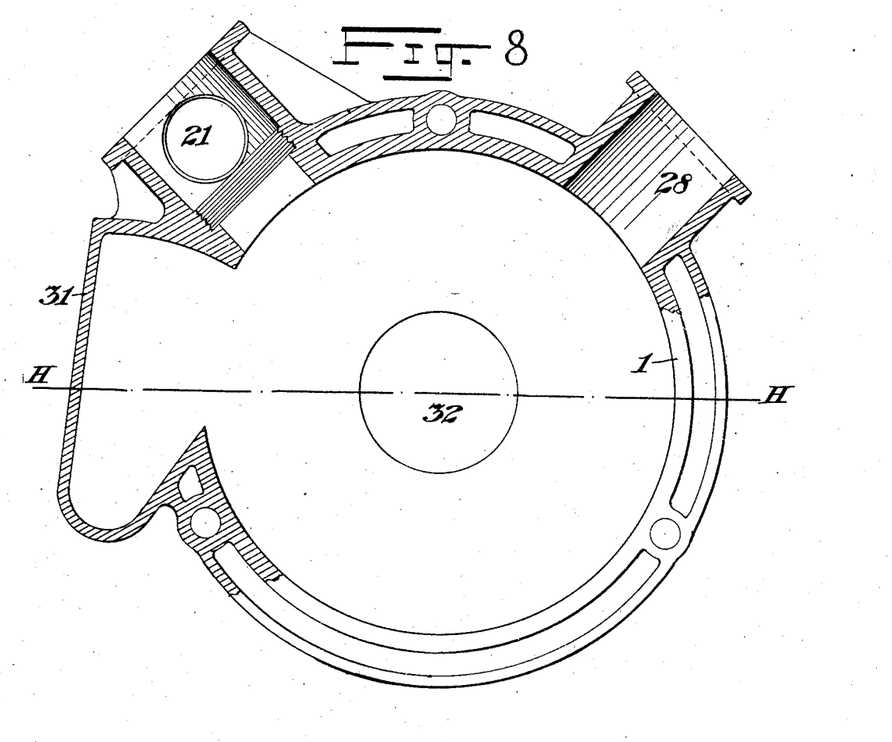
Fig. 8 is partly an elevation and partly a section of one of the end cylinder sections.
Figure 9:
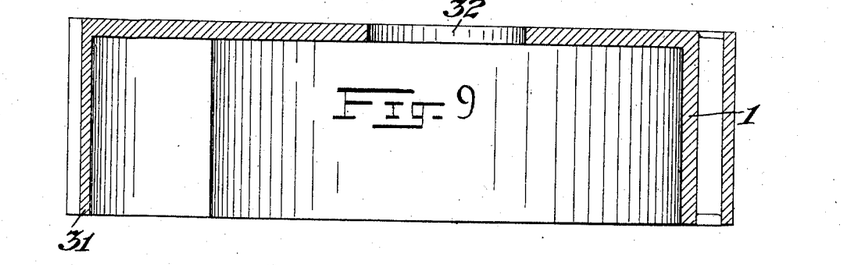
Fig. 9 is a section along the line H—H of Fig. 8.
Figure 10:
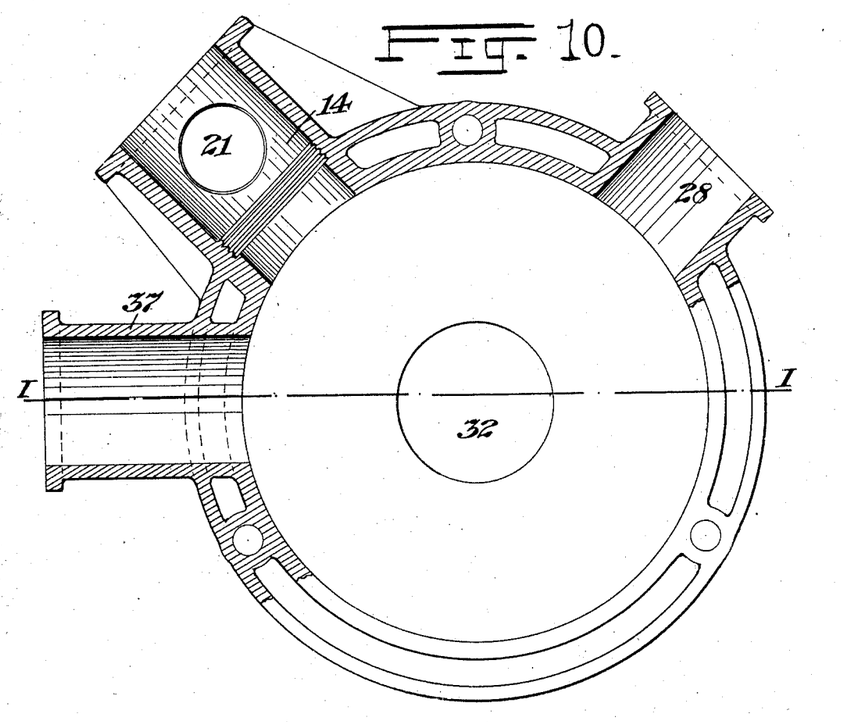
Fig. 10 is a view similar to Fig. 8, but showing the modified form of container or cap for the lock.
Figure 11:
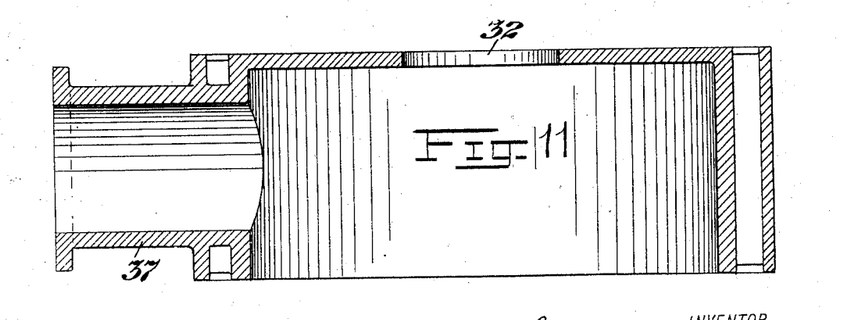
Fig. 11 is a section along the line I—I of Fig. 10.

The form of cylinder casing adapted to do the work described in connection with Fig. 1 is illustrated separately in Figs. 8 and 9. It will be seen that there is a central opening, 32, through the solid wall of each section, the same being adapted to receive and form by its walls a bearing for the bosses or flanges 5 on the piston sections 2. It will further be seen that each cylinder section is formed with only one closed end, the opposite end being open as shown, for example, at the bottom of Fig. 9.

Figure 4:
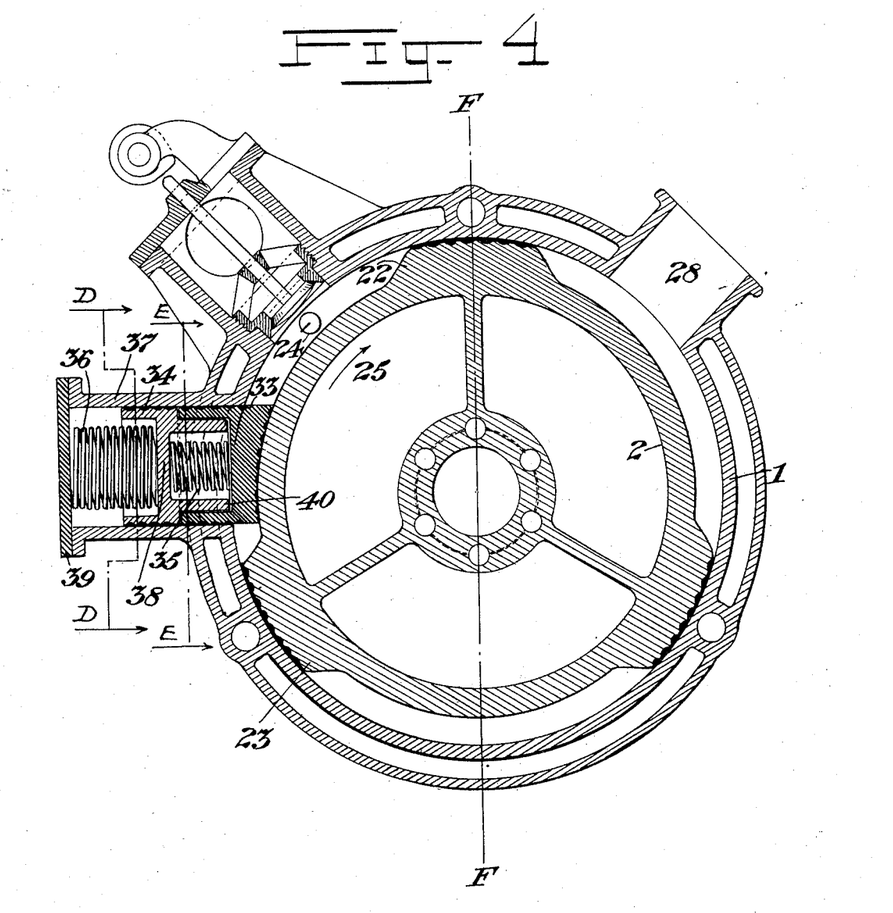
Fig. 4 is a section similar to that shown in Figs. 1 and 2, but showing a modified form of a lock forming part of my invention.

Referring now to the later figures of the drawing, it will be seen that in Fig. 4, for example, I show a substitute or modified form of locking device, the same being made up of two parts, 33 and 34, respectively, urged by springs, 35 and 36, in a direction toward the piston 2. These parts are for the most part contained within the box or chamber, 37, and adapted to slide therein under the influence of the springs. Starting with Fig. 4, it will be seen that the slide 33 rests against the surface of the piston 2, and it will be further seen that when the parts have been moved a little forward in the direction of the arrow, 25, the said part 33 which is hollowed out at one end to receive the part 34 will be pushed together with the part 34 in an outward direction, thereby compressing the spring 36 and maintaining the original compression upon the spring 35. The part 34 is narrowed at its inner end and also hollowed out to enter the opening in the slide 33 and at the same time to allow room for the spring 35, while the said part 34 is further hollowed out at the top to receive the spring 36 which is compressed between the solid cross portion 38 of the part 34 and a head or cap, 39, on the outer end of the box 37. The described compression of the spring 36 continues until the solid portion 23 near the lower left hand side of the piston, as shown in Fig. 4, shall have passed fully under the slide 33 and be ready to pass out from under it. When the actual passing takes place, the spring 35 acts upon the comparatively light slide 33 and pushes it down into engagement with the main body of the piston thereby preventing gas leakage. Subsequently, the spring 36, acting upon the part 34 presses the latter down until the two parts 33 and 34 occupy the same relative position as that shown in Fig. 4. It will be clear that the action of this locking device, so far as the prevention of leakage both at and after the explosion takes place will be similar to that of the locking device already described in connection with Figs. 1, 2 and 3. Moreover, the upper wall of the slide 33 constitutes a solid resisting wall for the explosion which takes place in the chamber 22.

Figure 5:
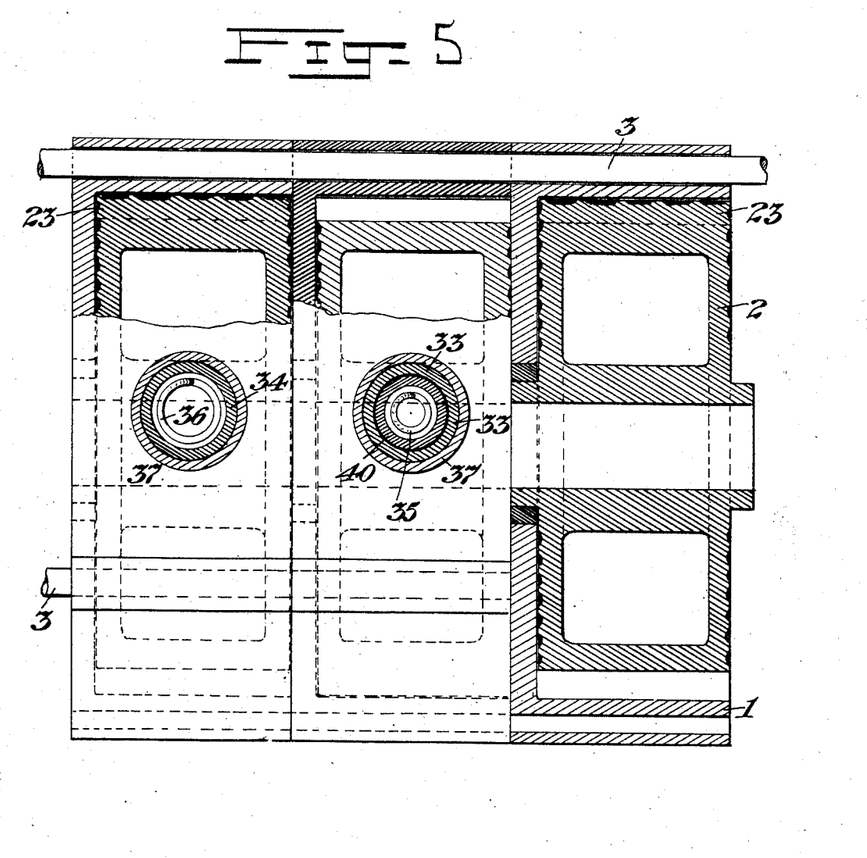
Fig. 5 is a section and part elevation of a portion of my rotary motor, showing at the left a section along the line D—D of Fig. 4, in the middle a section along the line E—E of Fig. 4, and at the right a section along the line F—F of Fig. 4.

In Fig. 5 the several sections toward the left and middle of the figure show clearly the relations of the parts just described. The narrowed portion of the part 34 is shown in Fig. 5 at 40 and the same numeral is applied to the same part in Fig. 4.

Figure 6:
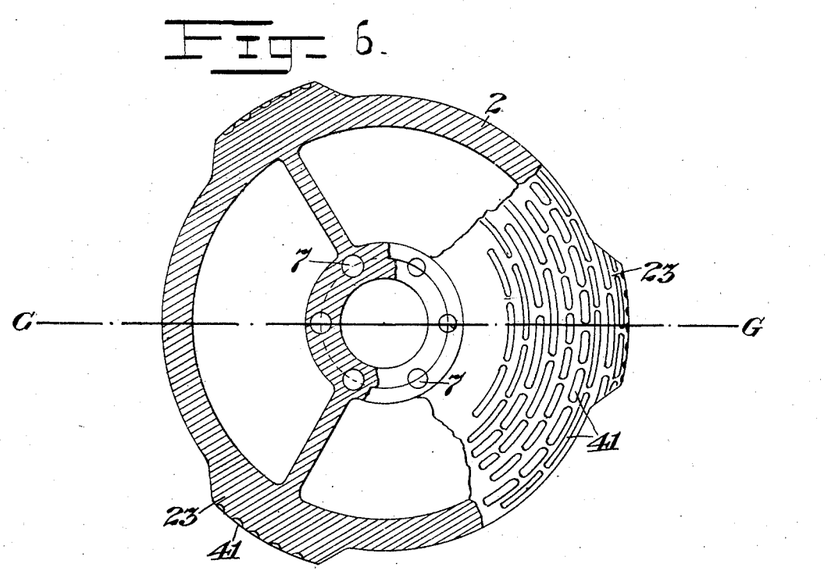
Fig. 6 is partly a section and partly an elevation of one of the piston sections.
Figure 7:
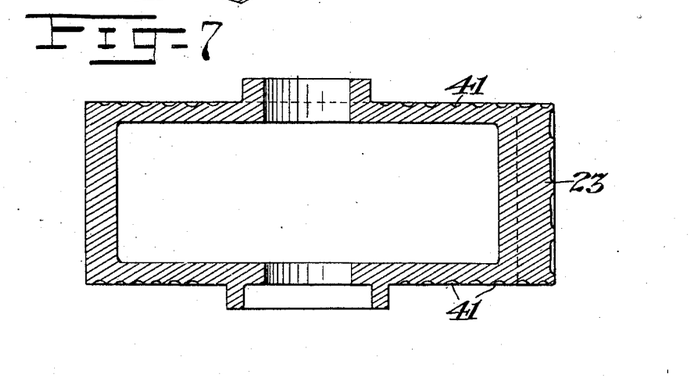
Fig. 7 is a section along the line G—G of Fig. 6.

As a detail of the piston and the locking devices, I call attention to recesses or depressions, 41, 41, in the ends of the piston sections (see Fig. 6) and also in the outer edges of the solid portions 23, 23. Similar recesses or depressions appear also in the faces of the locking devices 27, 33 and 34 where they come next to surfaces of the piston sections and also where the movable parts come next to the walls of their containing boxes or holders. The object of this construction is to provide, in case of any possible leakage of gas from the chamber 22, for the formation of a collection of this gas in various pockets in line with the discharge from the chamber 22 whereby a cushioning and ultimately a preventive effect is produced whenever there is a tendency for any further discharge of gas from the chamber 22 at the time of an explosion or any other time. In fact, the little pockets of gas are designed to form a seal, or, as it were, an elastic washer, for preventing the discharge of gas in injurious quantities under any circumstances.

Incidentally, I may call attention to the fact that the seat for the valve 15 is carried by a flange screw piece, 42, screwed into the chamber 14 at the bottom thereof.

Manifestly, with the construction herein described a single rotation of the composite piston requires twelve successive explosions, thus tending to increase the power of the motor as a whole. This is under the assumption that there are four cylinders and four pistons side by side in the particular motor referred to. If six cylinders are employed, then the number of explosions will be eighteen, each tending to urge the pistons forward through a limited angular distance and all combining to produce an efficient motor. Should it be desired to alter the output of energy by the motor, it is only necessary to increase or reduce, as the case may be, the number of cylinders and piston sections, though, in that case, the piston sections might themselves require to be changed in position or in the relation of the solid wall portions thereof, in order to secure uniformity in the work to be done by the several explosions. This feature of adaptability to the needs of the work in hand is one of the significant features of my invention.

The parts which I have called the solid walls separating succeeding chambers on the same piston may perhaps more properly be described as heads or projections on the piston; and in the claims which follow I so describe them.

It may be further stated with regard to the pockets or depressions 41, 41 referred to herein that they furnish small expansion chambers into which escaping gas expands and by losing its speed lessens the tendency of the gas to escape altogether. There being a large number of these pockets or depressions the practical effect is to prevent all injurious escape of gas and thereby tend to increase the efficiency of the motor.

I claim as my invention:—

1. In a fluid pressure motor, a series of stationary communicating cylinders, a series of piston sections constituting a composite piston rotatable in said cylinders, and heads or projections on said piston sections for receiving the impact of the gas explosions, the heads or projections on succeeding sections being arranged in different angular positions, means for varying said positions, and means for locking the several sections together whereby to prevent relative movement thereof.

2. In a fluid pressure motor, a series of stationary communicating cylinders, walls separating said cylinders to provide independent chambers, a series of piston sections constituting a composite piston rotatable in said chambers, and heads or projections on said piston sections for receiving the impact of the gas explosions, the heads or projections on succeeding sections being arranged in different angular positions, the displacements thus formed on the piston as a whole representing uniform angular distances, and means for locking said sections together to prevent relative movement of said heads.

3. In a fluid pressure motor, a stationary cylinder, said cylinder comprising a series of sections each having an open and a closed end whereby to provide a plurality of independent chambers, a piston section rotatable in each of said chambers and heads or projections arranged in different angular positions on said sections, in combination with means for attaching a succeeding cylinder section and a succeeding piston section.

4. In a fluid pressure motor, a series of stationary communicating cylinders, said cylinders comprising each a section having a closed end whereby to provide independent chambers, a series of piston sections constituting a composite piston rotatable in said chambers, and heads or projections arranged in different angular positions on said piston sections, the construction being such that the number of cylinder sections and the number of piston sections may be varied.

5. In a fluid pressure motor, a composite piston made up of a plurality of piston sections, and heads or projections arranged in different angular positions on said piston sections, and means for coupling the successive sections to each other to provide a shaft, such means admitting of the angular adjustment of the said sections.

6. In a fluid pressure motor, a stationary cylinder, a piston rotatable therein, heads or projections on the piston, the engaging surfaces of one of said members being provided with a plurality of discontinuous closed pockets disposed along the line of natural leakage, said pockets being staggered with respect to each other and constituting cushioning elements for preventing undue leakage.

7. In a fluid pressure motor, a stationary cylinder, a piston rotatable therein, heads or projections on the said piston, a locking device, and means for pressing the same against the periphery of the piston, the said locking device being provided on the side adjacent to the piston with a plurality of closed pockets disposed along the line of natural leakage, and the heads or projections on the piston being likewise provided with recesses or depressions.

8. In a fluid pressure motor, a cylinder, a piston rotatable therein and a lock for the said piston, said lock consisting of a spring pressed piece having a surface adapted to be pressed against the surface of the piston and conforming to the curve thereof, the said surfaces being provided with recesses or depressions on their engaging surfaces.

Signed at New York, in the county of New York, and State of New York, this 19th, day of August, A. D. 1907.

CHARLES DE LUKACSEVICS.

Witnesses:
  WM. H. CAPEL,
  GEORGE H. STOCKBRIDGE.